United States Patent [19]

Shimizu

[11] Patent Number: 5,543,871
[45] Date of Patent: Aug. 6, 1996

[54] CAMERA CAPABLE OF MAGNETICALLY RECORDING PHOTOGRAPH INFORMATION ON A FILM

[75] Inventor: Tokuo Shimizu, Hachioji, Japan

[73] Assignee: Olympus Optical Co. Ltd., Tokyo, Japan

[21] Appl. No.: 391,531

[22] Filed: Feb. 21, 1995

Related U.S. Application Data

[62] Division of Ser. No. 218,894, Mar. 28, 1994.

[30] Foreign Application Priority Data

Mar. 29, 1993 [JP] Japan ................................. 5-70137
Apr. 1, 1993 [JP] Japan ................................. 5-75822

[51] Int. Cl.[6] ........................................... G03B 17/14
[52] U.S. Cl. ............................................ 354/106
[58] Field of Search ............................. 354/105, 106; 360/1, 3, 75, 76, 105, 130.3, 130.31, 130.32

[56] References Cited

U.S. PATENT DOCUMENTS 5,005,031  4/1991  Kelbe ..................................... 354/106
5,307,100  4/1994  Kubo ..................................... 354/105

FOREIGN PATENT DOCUMENTS 3-168624  7/1991  Japan .
3-200130  9/1991  Japan .
4-1622    1/1992  Japan .

Primary Examiner—Howard B. Blankenship
Attorney, Agent, or Firm—Louis Weinstein

[57] ABSTRACT

A camera includes a driving unit for rotating a film winding spool in a predetermined direction to wind the film or for rotating a spool in a loaded film patrone in a predetermined direction to rewind the film, a magnetic head pressing unit presses a magnetic head against a magnetic record section of the film interlocking with and responsive to rotation of the film winding or rewinding spool, an activating unit for activating the magnetic head pressing unit to retract from the film when an operation of the driving unit is stopped or when the spool is rotated in a direction opposite to the predetermined direction. The magnetic head is arranged at an inclined angle relative to the normal film traveling direction such that a magnetic gap of the magnetic head contacts the magnetic record section of the film at substantially a right angle relative to a bent portion of the film upon contact of the magnetic head with the film.

4 Claims, 9 Drawing Sheets

CAMERA CAPABLE OF MAGNETICALLY RECORDING PHOTOGRAPH INFORMATION ON A FILM

This is a DIVISION of Application Ser. No. 08/218,894 filed Mar. 28, 1994.

BACKGROUND OF THE INVENTION

1. Field of the Invention

This invention relates to a camera capable of magnetically recording photograph information on a film, more specifically to a camera having a magnetic head for recording or reproducing the photograph information on or from a magnetic record section.

2. Related Background Art

Recently many proposals have been made in which there is used a film with a magnetic record section of a stripe shape on or from which there is recorded or reproduced photograph information such as the date when a photograph is taken and the size of a photograph screen and a camera has therein a magnetic head for recording or reproducing the photograph information. More specifically, there is proposed as one of the proposals the technique in which a magnetic head is retracted from a film traveling path in sending of the film to surely send the film in a camera using a film patrone for automatically sending out the distal end portion of the film, that is, in an automatically loading type camera in which a spool of a loaded film patrone is rotated in a direction opposite to a rewinding direction to automatically send out the distal end portion of the film from the patrone.

That is, it is disclosed in the Japanese Laid-Open Patent Application No. 200130 of 1991 that a magnetic head is stopped at a position retracted from a film traveling path by activating means utilizing a spring charge when a film patrone is loaded in a camera and the stopper of the magnetic head is released such that the magnetic head contacts a magnetic record section of the film when film distal end detecting means disposed on the film traveling path between the magnetic head and a winding spool detects a film distal end portion.

In the Japanese Laid-Open Patent Application No. 1622 of 1992, it is disclosed that perforations of a film are counted and when it is determined from the count that the film is wound on a winding spool a magnetic head retracted from a film traveling path is moved to press the film.

However, there is a problem in that the technique disclosed in the Japanese Laid-Open Patent Application No. 200130 of 1991 requires the film distal end detecting means and the activating means for spring charge by the loading of the film patrone and reliability is lacking because the structure is complicated and the distal end portion of the deflectable film is detected by the film distal end detecting means. Further, there is a problem in that the technique disclosed in the Japanese Laid-Open Patent Application No. 1622 of 1992 requires a space for arranging a motor driving means in the camera so that the camera becomes large in size, resulting in increasing cost, because the motor driving means for moving a magnetic head alone is activated when it is detected that the film is wound on the winding spool.

The film used in a camera of this type and having a magnetic record section which is formed in a stripe manner along the film traveling direction by coating or depositing, is not thin but has strong firmness. Therefore, it is difficult to fit the magnetic head to the magnetic record section and a device is required for fitting means of the magnetic head.

That is, as shown in FIG. 19, in a case of a very thin, and pliant and easily folded tape such as a magnetic tape for audio or a VTR, there is effective and in practice the means for sandwiching an audio magnetic tape 82 traveling in an arrow direction by a magnetic head 81 activated toward the tape 82 by a spring 84 and a pressing pad 83 disposed at a position opposite to the magnetic head 81 and activated toward the tape 82 by a spring 85, to fit a magnetic gap section 81a to the tape.

However, in a case of photograph film having a magnetic record section of a stripe manner, as shown in FIG. 7, because a film base is thick, i.e., the firmness of the film is great, an inflated portion is produced on the film in the film traveling direction so that the center of the magnetic gap section 71a is not coincident with that of the inflated portion of the stripe-shaped magnetic record section in the film 72 to cause a deviation x, after the film traveling in the arrow direction passes through the magnetic head 71 when there is provided an overgoing amount L by activating the magnetic head 71 by a spring 73. As a result, there is caused the problem that the fitness of the magnetic gap section 71a to the stripe-shaped magnetic record section of the film 72 becomes so poor that desired magnetic recording/reproducing cannot be achieved.

For this reason, as disclosed in Japanese Laid-Open Patent Application No. 168624 of 1991, there is proposed the technique in which a stripe-shaped magnetic record section of a film is sandwiched by a magnetic head and a pressing pad so that the fitness between the magnetic head and the film is increased and additionally harmful influence to a taken photograph because of a bent portion of the film is suppressed at a minimum. As shown in FIG. 18, in this technique the stripe-shaped magnetic record section of the film 72 which is guided by a film rail 76 in an arrow direction is sandwiched by the magnetic head 71 disposed at a position opposite to the magnetic head 71 and activated by a spring 73 toward the film 72 and a pressing pad 74 activated toward the film 72 by a spring 75 having elasticity which is not so strong and the elasticity of the spring 75 for activating the pressing pad 74 is set smaller than that of the spring 73 for activating the magnetic head 71.

However, even if the stripe-shaped magnetic record section of the film 72 is sandwiched by the magnetic head 71 and the pressing pad 74 and there is given a difference between the springs 73 and 75 in elasticity as described in the above Japanese Laid-Open Patent Application No. 168624 of 1991, the deviation x between the center of the magnetic gap section 71a and that of the bent portion of the stripe-shaped magnetic record section in the film 72 cannot be eliminated because the firmness of the film is great as described above. In order to further eliminate the deviation x, if the elasticities of the spring 73 for activating the magnetic head and the spring 75 for activating the pressing pad are made large, the film traveling load is increased so that a new problem is caused such as the increasing of consumption of a battery, the prevention of the film from traveling at a constant speed and generation of damage on the film. In addition, because the film is sandwiched by the magnetic head and the pressing pad, many parts are required for the camera so that it is made difficult to reduce camera size.

SUMMARY OF THE INVENTION

The first object of the present invention is to provide a camera capable of eliminating the above conventional drawbacks and magnetically recording photograph information on a film nevertheless a simple structure, in which camera a magnetic head can be surely pressed to a magnetic record section of the film in winding of the film and the magnetic head can be retracted from the magnetic record section of the film in loading and rewinding of the film and in a stopped state of the film.

The second object of the present invention is to provide a camera of a simple structure capable of magnetically recording photograph information on a film, in which camera a magnetic head can be reliably pressed to a magnetic record section of the film in rewinding of the film to record or reproduce the photograph information and the magnetic head can be retracted from the magnetic record section of the film in a stopped state of a film rewinding driving means.

The third object of the present invention is to provide a camera capable of magnetically recording photograph information on a film, in which camera a magnetic head is pressed against a magnetic record section of the film by use of magnetic head pressing means skillfully utilizing a epicyclic gear mechanism only when the photograph information is recorded on the magnetic record section of the film or the recorded photograph information is reproduced, and the magnetic head is otherwise moved to a position retracted from the magnetic record section of the film.

The fourth object of the present invention is to provide a camera capable of eliminating the above conventional drawbacks and magnetically recording photograph information on a film in which camera the fit of the magnetic head to the stripe-shaped magnetic record section can be improved and the flatness of the film can be also increased even if the film is thick and the firmness of the film is great.

The fifth object of the present invention is to provide a camera capable of magnetically recording photograph information on a film in which camera the magnetic head can fit well to the stripe-shaped magnetic record section even if a film which is quite thick and quite firm is used.

The sixth object of the present invention is to provide a camera capable of magnetically recording photograph information on a film in which camera the bent portion of the film because of striking of a magnetic head can be suppressed in the film traveling direction so that the flatness of the film can be increased.

Briefly, the present invention is characterized in that:

a magnetically recordable camera having a magnetic head for recording a information on a magnetic record section of a film or reproducing the information recorded on the magnetic record section of the film includes driving means for rotating a film winding spool in a predetermined direction to wind the film or rotating a spool in a loaded film patrone in a predetermined direction to rewind the film, magnetic head pressing means interlocking rotation of the spools by the driving means to press the magnetic head to the magnetic record section of the film, and activating means for retracting the magnetic head pressing means from the magnetic record section of the film when the driving means is stopped or when the spools are rotated in a direction opposite to the predetermined direction, an automatic loading type camera constructed such that a film is automatically sent out from an exit of a loaded film patrone, includes sending driving means for rotating a spool in the loaded film patrone in a predetermined direction to send out the film, traveling amount detecting means for detecting a traveling amount of the film sent out, winding driving means for rotating a film winding spool in a predetermined direction to wind the film when an output from the traveling amount detecting means is a predetermined value, magnetic head pressing means having a magnetic head for recording or reproducing a photograph information on or from a magnetic record section of the film and interlocking with the rotation of the spool by the winding driving means, for pressing the magnetic head to the magnetic record section of the film, film guide means disposed in the magnetic head pressing means, for pressing the film toward an outer surface of the winding spool when the magnetic head pressing means moves in a direction for pressing the film, and activating means for retracting both the magnetic head pressing means and the film guide means from the film when the driving means is stopped, or when the spool is rotated in a direction opposite to the predetermined direction, or in a magnetically recordable camera in which a magnetic gap section of a magnetic head for recording or reproducing information is arranged such that the magnetic gap section presses a magnetic record section of a film, the magnetic head is arranged to have a predetermined inclined angle against a film traveling direction so that the magnetic gap section can contact the magnetic record section at a substantially right angle, and a roller for restricting a bent portion of the film is arranged on a side opposite the magnetic head with respect to the film such that the outer surface of the roller contacting with the film is positioned on substantially the same plane as a film rail plane.

According to the present invention, the magnetic head is pressed on the magnetic record section by the magnetic head pressing means using an epicyclic gear mechanism only when the photograph information is recorded on the magnetic record section of the film or the photograph information recorded on the magnetic record section is reproduced, and the magnetic head is otherwise moved to a position retracted from the magnetic record section of the film. Therefore, there can be provided a camera capable of magnetically recording photograph information on the film and having a simple structure and high reliability while the conventional drawbacks are eliminated, without requiring a large space in the camera and without increasing the cost of the camera. In addition, in a automatic loading type camera in which a rewinding spool in the film patrone is rotated so as to send out the distal end portion of the film, the magnetic head and the guide member of the film are retracted in the sending out of the distal end portion of the film so that a supply means for reliably sending out the film can be constructed. Further, the stable operations of magnetically recording and reproducing can be achieved in winding of the film by making the guide member contact the winding spool in the winding of the film to press the magnetic head on the magnetic record section of the film.

Furthermore, by arranging the magnetic head to having an inclined angle with respect to the film traveling direction, the fit of the magnetic gap section to the stripe-shaped magnetic record section of the film is increased even if a thick film having great firmness is used. In addition, because a pair of rollers for restricting the bent portion are arranged before and after the contact position of the magnetic head with the film in the film traveling direction, it is possible to make the bent portion of the film small, resulting in increasing the flatness of the film.

DETAILED DESCRIPTION OF THE EMBODIMENTS OF THE PRESENT INVENTION

Figure 1:
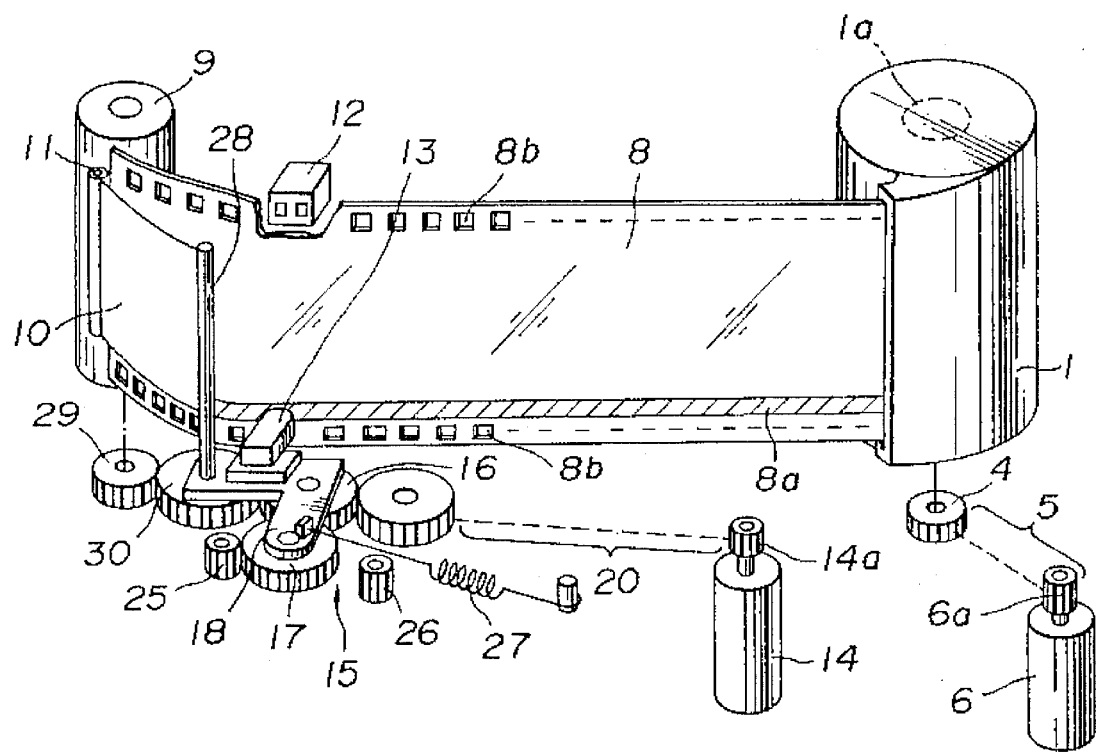
FIG. 1 is a perspective view of a main portion of a camera for magnetically recording photograph information according to a first embodiment of the present invention.
Figure 3:
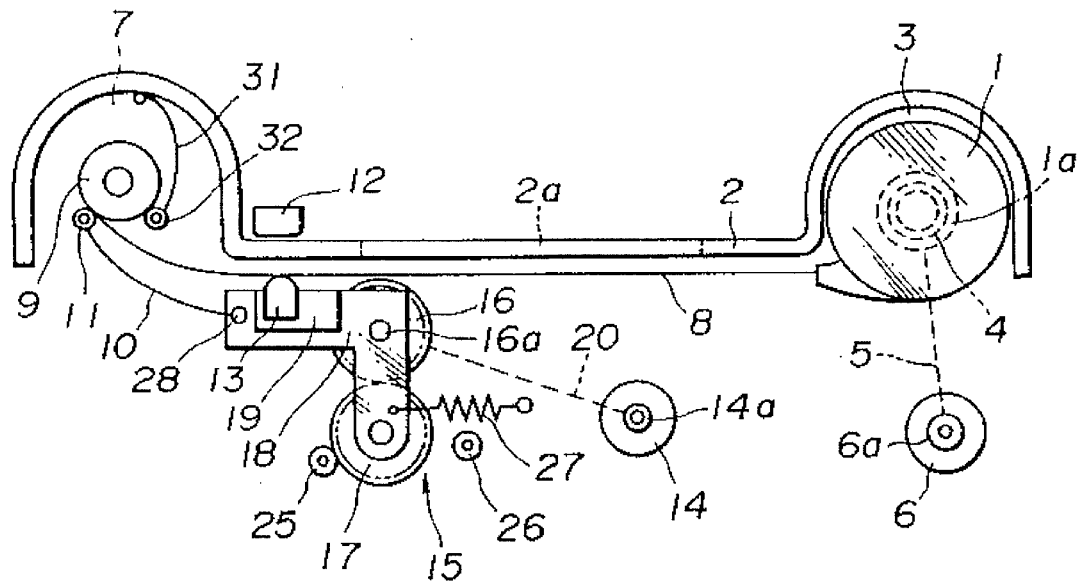
FIG. 3 is a plan view of the main portion of the camera employed in the first embodiment.

FIGS. 1 and 3 show an essential part of a camera according to an embodiment of the present invention in which the camera magnetically records photograph information on a film. This camera is of an automatic loading type and a film patrone 1 loaded in a film supply chamber 3 of a camera body 2 is coupled to a spool rotating gear 4 in such a manner that a rewinding spool 1a in the film patrone 1 is rotatably driven by the spool rotating gear 4. The spool rotating gear 4 is connected to an output gear 6a of a rewinding motor 6 as rewinding mechanism driving means through a reduction gear train 5 shown in dotted fashion for simplicity. By loading the film patrone 1 in the film supply chamber 3 to load a film 8, the rewinding motor 6 rotates in a direction reverse that when the film is rewound and the rewinding spool 1a is also rotated in a reverse direction to that when the film 8 is rewound, so that a distal end portion of the film is outputted from the patrone 1. This outputted film distal end portion travels to extend immediately after an aperture 2a disposed on a camera body 2 and is then guided by a film guide plate 10 and a guide roller 11 constituting film guide means to be wound on a winding spool 9 in a film winding chamber 7.

The film 8 has a magnetic record section 8a including a magnetic recording zone for the photograph information to be recorded provided in a lower portion of the film on the back side along the film traveling direction, as well as perforations 8b perforated on the respective side edge portions as is well known. A reflection type photointerrupter 12 is disposed at the position opposing the perforations 8b at the upper side edge portion to constitute film detecting means and counts the predetermined number of perforations in loading of the film 8. When it is detected from the count perforations of a predetermined number that the film has been sent out for a proper length from the distal end portion, the rewinding motor 6 is stopped and then a winding motor 14 (to be referred to later), which constitutes film winding mechanism driving means, is driven so that the winding spool 9 is rotated in a film winding direction for the film to be wound.

A magnetic head 13 for recording or reproducing the photograph information on or from the magnetic record section 8a of the film 8 is disposed near the film winding chamber 7 side on the back side of the film, and is switched or moved between a position where the head 13 contacts the magnetic record section 8a to press it and a position where the head is retracted. Switching means for this operation is disposed below the magnetic head 13 and can be achieved by magnetic head pressing means 15 including a well known epicyclic gear mechanism or sun and planet gear mechanism which is arranged to utilize a part of a power transmission system for the winding motor 14. That is, in the epicyclic gear mechanism, rotation power is transmitted from an output gear 14a of the winding motor 14 to a sun gear 16 via a reduction gear train 20 (shown in dotted fashion for simplicity) and the sun gear 16 and a planet gear 17 engaging with the sun gear 16 are coupled to each other by an arm of an L-shaped carrier 18 in such a manner that the planet gear 17 revolves around the sun gear 16 while rotating.

Figure 2:
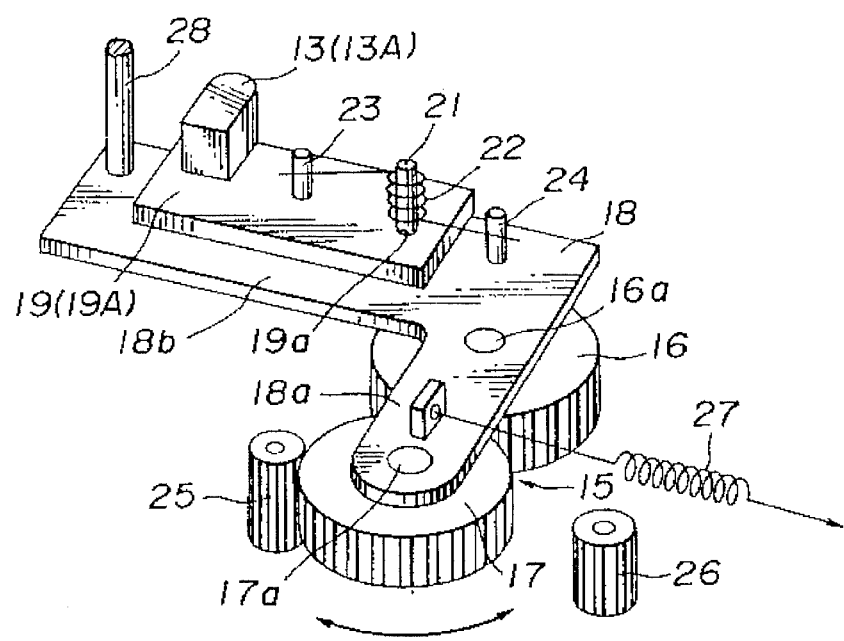
FIG. 2 is an expanded perspective view of a magnetic head pressing means employed in the first embodiment.

This carrier 18 is formed of an L-shaped oscillating lever as shown in FIG. 2 and the oscillating fulcrum in the bending portion is turnably supported by a supporting axis 16a of the sun gear 16. A support axis 17a of the planet gear 17 is rotatably supported at the distal end portion of the arm 18a extending backward of the camera. A head holding plate 19 as a member for holding the magnetic head is relatively movably mounted on the other arm 18b which extends in a direction substantially orthogonal to the arm 18a of the carrier 18 and the magnetic head 13 is fixed to the head holding plate 19. The other arm 18b is moved to the position where the other arm 18b is substantially parallel to the film 8 when the magnetic head 13 is pressed against the magnetic record section 8a of the film 8.

The head holding plate 19 is formed in a stripe form and overlies the other arm 18b along a longitudinal direction of the other arm 18b. A support hole 19a disposed on a portion of the plate 19 near the support axis 16a is penetrated by the support axis 21 fixed to the other arm 18b so that the plate 19 can move turnably. A torsion spring 22 is disposed on the support axis 21 such that one end of the torsion spring 22 presses against a pin 23 fixed to the head holding plate 19 and the other end thereof presses against a pin 24 fixed to the other arm 18b, so that a function is given to move the magnetic head 13 forward. However, the movement of the magnetic head 13 by the function is normally inhibited because the head holding plate 19 strikes a stopper (not shown) disposed on the other arm 18b but the function is achieved by the torsion spring 22 such that the magnetic head 13 can press the magnetic record section 8a only when the magnetic head 13 should contact the magnetic record section 8a of the film 8. The torsion spring 22 acts to play a roll for adjusting a contact pressure when the magnetic head is pressed against the magnetic record section 8a of the film 8.

Also, a coil spring 27 is disposed between a stationary member of the camera and the arm 18a of the carrier 18. This coil spring 27 constitutes activating means for activating retracting means so that the magnetic head pressing means 15 and a guide roller 11 (to be referred to below) are retracted from the film when the transmission of rotation power from the winding motor 14 as driving means to the sun gear 16 is stopped.

In this manner, the magnetic head pressing means 15 having the carrier 18 is switched to a position where the magnetic head 13 is pressed against the magnetic record section 8a because the planet gear 17 revolves around the sun gear 16 when the rotation power is transmitted to the sun gear 16. The planet gear 17 engages with a stopper gear 25 and rotates at this switched position. When the carrier 18 is switched by the activating means to a position where the magnetic head 13 is retracted from the magnetic record section 8a, the planet gear 17 engages with a stopper gear 26 at this position.

A guide support axis 28 rises at the distal end portion of the other arm 18b of the carrier 18 as shown in FIGS. 1 and 3 and a film guide plate 10 extends toward the periphery of the winding spool 9 with the proximate end fixed to the support axis 28. The film guide plate 10 is formed of an thin elastic plate having a relatively wide width and the guide roller 11 is attached to the distal end portion to contact the periphery of the winding spool 9. It is noted that an elastic guide plate 31 having a proximate portion fixed to a wall of the winding chamber and a pressing roller 32 attached to the distal end of the guide plate 31 are arranged within the film winding chamber 7 in which the winding spool 9 is disposed, as shown in FIG. 3. The pressing roller 32 presses the film wound on the winding spool 9 in such a manner that the film can be prevented from being loosed, even when the film guide plate 10 and the guide roller 11 are retracted in the rewinding of the film.

As shown in FIG. 1, the winding spool 9 is coupled to a spool rotating gear 29 which engages with a transmission gear 30 which in turn engages with the sun gear 16 and rotation power is transmitted from the output gear 14a of the winding motor 14 to the spool rotating gear 29 via the reduction gear train 20, the sun gear 16 and the transmission gear 30.

Figure 4:
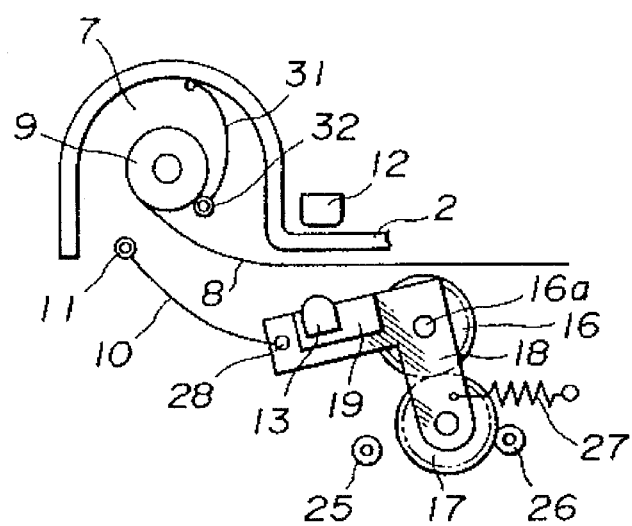
FIG. 4 is a plan view of the main portion of the camera showing the switching state of the magnetic head pressing means of the first embodiment.

In the camera capable of recording the photograph information on the film according to the first embodiment constructed described above, when the film patrone 1 is loaded in the film supply chamber 3, the rewinding motor 6 rotates in a direction reverse that used during film rewinding such that the rewinding spool 1a is rotated in a direction reverse to that in the film rewinding. Therefore, a film distal end portion is automatically sent out of the patrone 1. The end portion of the film travels to extend immediately after the aperture 2a of the camera body 2 and then is guided by the film guide plate 10 and the guide roller 11 to reach the winding spool 9. As shown in FIG. 4 in loading of the film the carrier 18 is pulled by the shrink elasticity of the coil spring 27 to turn around the axis 16a in the counter-clockwise direction and the planet gear 17 engages the stopper gear 26. Therefore, the magnetic head 13 is spaced apart from the traveling path of the film 8 and is located at the position retracted from the magnetic record section 8a and the guide roller 11 is also located at the position apart from the periphery of the winding spool 9.

The perforations are counted by the photointerrupter 12 as the end portion of the film 8 travels and a signal indicating the count is supplied to control means (not shown). When the count of the perforations reaches a predetermined number, the rotation of the rewinding motor 6 is stopped by the control means. Then, the winding motor 14 is driven by the control means not shown in the figures and the rotation power is transmitted from the output gear 14a to the spool rotating gear 29 via the reduction gear train 20, the sun gear 16 and the transmission gear 30 so that the winding spool 9 is rotated in the film winding direction to wind the film.

At this time, the planet gear 17 revolves around the sun gear 16 in the clockwise direction because of the rotation of the planet gear 17 through the rotation of the sun gear 16 in the film winding direction and engages with the stopper gear 25. Therefore, the carrier 18 turns around the support axis 16a in the clockwise direction against the shrink elasticity by the coil spring 27. In this manner, when the carrier 18 turns in the clockwise direction, the magnetic head 13 on the other arm 18b moves to the position where the magnetic head 13 contacts with the magnetic record section 8a of the film 8 extended and presses the magnetic record section 8a, as shown in FIGS. 1 and 3. Thus, photograph information for a screen of the photograph to be taken is recorded there.

After the photographs are taken one after another in this manner while a plurality of sets of photograph information are recorded, the rotation of the winding motor 14 is stopped in a case where the exposed film is to be rewound in the patrone 1. For this reason, the rotation power of the sun gear 16 to the planet gear 17 is not present so that the carrier 18 turns back in the counter-clockwise direction around the support axis 16a by the shrink elasticity of the coil spring 27. Thus, the planet gear 17 also revolves around the sun gear 16 in the counter-clockwise direction to engage with the stopper gear 26. As a result, the carrier 18 is switched from the head contact position to the head retracted position. Further, as shown in FIG. 4, the guide roller 11 moves at the position apart from the winding spool 9. By this, if the rewinding spool 1a is rotated in the rewinding direction by the rewinding motor 6, the exposed film can be smoothly rewound in the patrone 1.

Further, in a case where the photograph information magnetically recorded should be reproduced for confirmation, after the magnetic head 13 is set in the reproducing state, the operation in the film loading may be performed such that the film is wound on the winding spool 9 and the magnetic head 13 contacts with the magnetic record section 8a of the film 8.

Figure 5:
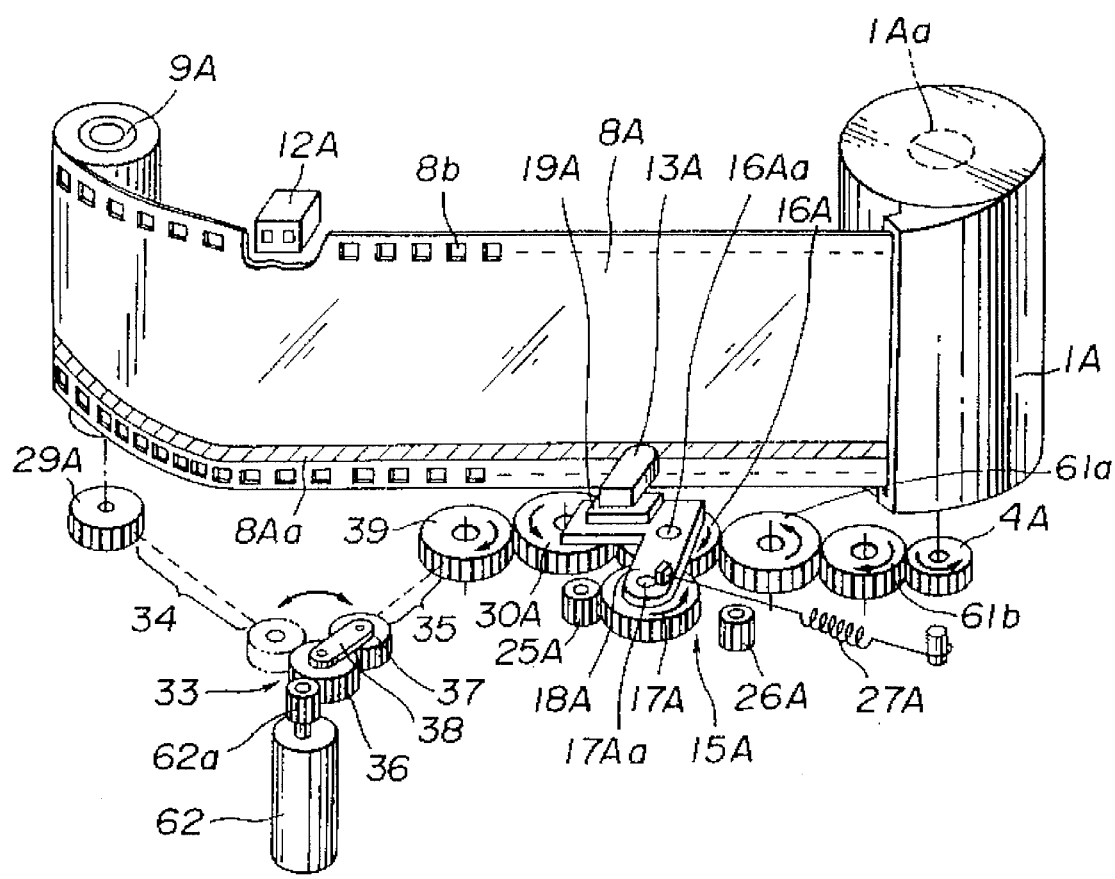
FIG. 5 is a perspective view of a main portion of a camera capable of magnetically recording photograph information according to a second embodiment of the present invention.

FIG. 5 shows a main portion of the camera capable of magnetically recording the photograph information on the film according to a second embodiment of the present invention. In the second embodiment, the photograph information is magnetically recorded on a magnetic record section 8Aa interlocking with the rewinding of the film, whereas the magnetic head pressing means is activated interlocking with the winding of the film in the first embodiment.

In this camera the film 8A is driven to travel by a driving motor 62 which can rotate in normal and reverse directions. A power switching clutch 33 including a planet clutch is disposed on an output gear 62a of the driving motor 62 such that the rotation power is transmitted to either a rotation power transmission system 34 (shown in dotted fashion for simplicity) including a reduction gear train for the winding of the film or another rotation power transmission system 35 including a reduction gear train for the rewinding of the film. That is, the planet clutch 33 includes a sun gear 36 engaging with the output gear 62a, a planet gear 37 engaging with the sun gear 36 and revolving around the sun gear while rotating and a carrier 38 for turnably coupling both the gears relative to each other.

When the driving motor 62 rotates in a direction and the planet clutch 33 is switched to the rotation power transmission system 34 for the winding of the film such that the rotation power is transmitted to the system 34, the spool rotating gear 29A rotates a winding spool 9A so that the film 8A is wound. Also, when the motor 62 rotates in the other direction and the planet clutch 33 is switched to the film rewinding rotation power transmission system 35 such that the rotation power is transmitted to the system 35, the rotation power is transmitted to the transmission gear 30A, the sun gear 16A, and the reduction gears 61a and 61b via the reduction gear 39 so that the spool rotating gear 4A is rotated. As a result, the rewinding spool 1Aa is rotated in the film rewinding direction to rewind the film in the patrone 1A.

It should be noted that the magnetic head pressing means 15A and the film detecting means in the second embodiment are constructed in the same manner as in the first embodiment.

That is, a magnetic head pressing means 15A is disposed above the sun gear 16A such that the magnetic head 13A for recording the photograph information on the magnetic record section 8Aa of the film 8A can be switched between a position where the head 13A is pressed against the magnetic record section 8Aa to contact therewith and a position where the head is retracted. The epicyclic gear mechanism including the sun gear 16A is constructed of the sun gear 16a, the planet gear 17A engaging with the sun gear 16A and revolving around the sun gear 16A while rotating and a carrier 18A for coupling gears 16A, 17A to each other. This carrier 18A is formed of an L-shaped oscillating lever and the oscillating fulcrum in the bending portion is turnably supported by a supporting axis 16Aa of the sun gear 16A. A supporting axis 17Aa of the planet gear 17A is rotatably supported at the distal end portion of the arm extending backward and a head holding plate 19A as a member for holding the magnetic head is relatively movably mounted on the other arm which extends in a direction substantially orthogonal to the arm 18A of the carrier 18A. The magnetic head 13A is fixed to the head holding plate 19A. The other arm is moved to the position where the other arm is substantially parallel to the film 8A when the magnetic head 13 is pressed against the magnetic record section 8Aa of the film 8A.

The head holding plate 19A is formed in a stripe form and constructed in quite the same manner as shown in FIG. 2. That is, as shown in FIG. 2, the proximate portion of the plate 19A is rotatably penetrated by a support axis 21. A torsion spring 22 is disposed on the support axis 21 such that one end of the torsion spring 22 is pressed against a pin 23 fixed to the head holding plate 19A and the other end thereof is pressed against a pin 24 fixed to the other arm, so that a function is given to move the magnetic head 13A forward. However, the movement of the magnetic head 13A by the function is normally inhibited because the head holding plate 19A strikes a stopper (not shown) disposed on the other arm but the function is achieved such that the magnetic head 13 can be pressed against the magnetic record section 8Aa by the torsion spring 22 only when the magnetic head 13A should contact with the magnetic record section 8Aa of the film 8A. The torsion spring 22 acts to play a roll for adjusting a contact pressure when the magnetic head 13A is pressed against the magnetic record section 8Aa of the film 8A.

In the camera constructed in the manner described above and capable of magnetically recording photograph information on the film according to the second embodiment of the present invention, if the film patrone 1A is loaded in the film supply chamber and the rotation power from the driving motor 62 is transmitted to the rotation driving power transmission system 34, the spool rotating gear 29A is rotated such that the film is wound on the winding spool 9A.

It should be noted that the sun gear 16A rotates in a direction reverse to that in the rewinding of the film and the planet gear 17A engages with the stopper gear 26A due to the shrink elasticity of the coil spring 27A. As a result, the magnetic head 13A is moved apart from the traveling path of the film 8A and has been moved to the position retracted from the magnetic record section 8Aa. The Photographs are taken for the film 8A loaded thus.

Next, in order to record the photograph information on the magnetic record section 8Aa in the rewinding of the film, the driving motor 62 is rotated in the film rewinding direction. If the driving motor 62 is rotated in the film rewinding direction, the planet clutch 33 is switched such that the rotation driving power is transmitted to the driving power transmission system 35. As a result, the gears rotate in the arrow directions shown, respectively, to rotate the spool rotating gear 4A so that the rewinding spool 1Aa is rotated in the film rewinding direction such that the film can be rewound in the film patrone 1A. At this time, because the sun gear 16A rotates in the clockwise direction in FIG. 5, the planet gear 17A revolves around the sun gear 16A in the clockwise direction while rotating in the counter-clockwise direction and then engages with the stopper gear 25A. Thus, the carrier 18A turns around the support axis 16Aa in the clockwise direction against the shrink elasticity of the coil spring 27A. When the carrier 18A turns in the clockwise direction, the magnetic head 13A on the other arm moves to the position where the magnetic head 13A contacts with the magnetic record section 8Aa of the film 8A being rewound and is pressed against the magnetic record section 8Aa. In this manner, the photograph information for a screen taken is magnetically recorded.

Figure 6:
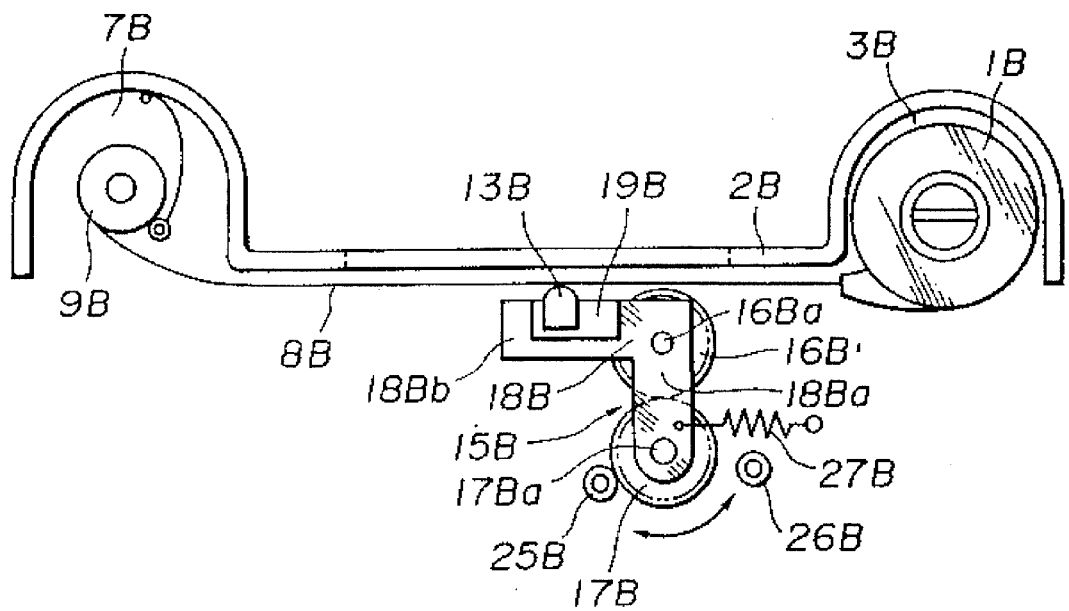
FIG. 6 is a plan view of a main portion of a camera capable of magnetically recording photograph information according to a third embodiment of the present invention.
Figure 7:
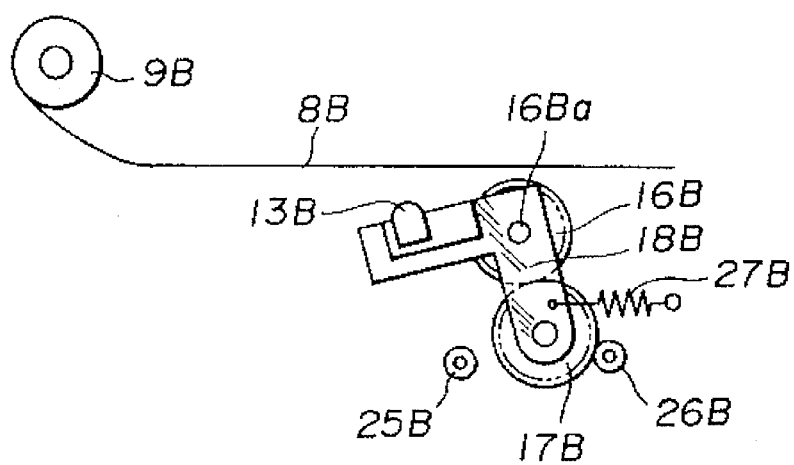
FIG. 7 is a plan view of the main portion of the camera showing the switching state of the magnetic head pressing means of the third embodiment.

FIGS. 6 and 7 show main portions of the camera capable of magnetically recording the photograph information on the film according to a third embodiment of the present invention. The present invention is applied to the camera in which the film is loaded in a usual manner, unlike the automatic loading type camera according to the first embodiment in which the rewinding spool in the film patrone is rotated in the reverse direction such that the film distal end portion is sent out.

In this embodiment, one gear of a reduction gear train for transmitting the rotation driving power for film winding or film rewinding is used as the sun gear of the epicyclic gear mechanism. For instance, one gear of the reduction gear train for the film winding is provided as the sun gear 16B. Magnetic head pressing means 15B is constituted such that a planet gear 17B the sun gear 16B and that stopper gears 25B and 26B are arranged on opposite sides of the planet gear 17B to restrict the region of the revolution of the planet gear 17B. An oscillating fulcrum of a carrier 18B of an L-shaped lever is turnably mounted at the support axis 16B*a* of the sun gear 16B and a support axis 17B*a* of the planet gear 17B is rotatably mounted on an arm 18B*a* of the carrier 18B while a magnetic head 13B is mounted on the other arm 18B*b* of the carrier 18 through a head holding plate 19B. A coil spring 27B has its opposite ends respectively hung on the arm 18B*a* and a stationary member of the camera such that the carrier 18B functions to turn around the support axis 16B*a* in the counter-clockwise direction.

Such an arrangement allows the carrier 18B to turn around the support axis 16B*a* in the counter-clockwise direction due to the shrink elasticity of coil spring 27B until the film rewinding driving system starts operation, i.e., while the film rewinding motor is in the stopped state, so that the planet gear 17B revolves around the sun gear 16B in the counter-clockwise direction to switch the carrier to the position where the planet gear 17B engages with the stopper gear 26B, i.e., where the magnetic head 13B is retracted from film 8, as shown in FIG. 7.

After a film patrone 1B is loaded into a film supply chamber 3B of a camera body 2B and the distal end portion of a film 8B is wound on a winding spool 9B in a film winding chamber 7B, a film winding motor is driven and rotated. By this, because the planet gear 17B revolves around the sun gear 16B in the clockwise direction through the rotation of the sun gear 16B in the film winding direction to engage with the stopper gear 25B, the carrier 18B turns around the support axis 16B*a* in the clockwise direction against the shrink elasticity of coil spring 27B. Thus, when the carrier 18B turns in the clockwise direction, magnetic head 13B on arm 18B*b* moves to the position where the magnetic head 13B contacts the magnetic record section of the extended film 8B and presses against the magnetic record section, as shown in FIG. 6. In this manner, the photograph information for a taken screen can be magnetically recorded.

Thereafter, in a case where the exposed film 8B is to be rewound in the patrone 1B after taking photographs and the magnetic recording of the photograph information for the taken photographs on the film are completed, the winding motor is stopped. By this, the driving power from the sun gear 16B to the planet gear 17B is not present and the carrier 18B turns around the support axis 16B*a* in the counter-clockwise due to the shrink elasticity of coil spring 27*b*, as shown in FIG. 7. As a result, the planet gear 17B also revolves around the sun gear 16*b* in the counter-clockwise direction to engage stopper gear 26B. Thus, carrier 18B is switched from the head contact position to the head retracted position. In this manner, if the rewinding spool is rotated in the rewinding direction by the rewinding motor, the exposed film can be rewound smoothly in the patrone 1B.

It should be noted that although the one gear of the reduction gear train for winding the film is provided as the sun gear 16B in the above embodiment, one gear of the reduction gear train for rewinding the film may be provided as the sun gear 16B and the carrier 18B may be switched such that the magnetic head 13B is pressed against the film 8B to magnetically record the photograph information on the magnetic record section when the sun gear is rotated in the film rewinding direction and that the pressing of the magnetic head 13B against the film 8B is released due to the shrink elasticity of coil spring 27B when the sun gear is kept stopped or is rotated in another direction.

Next, a camera capable of magnetically recording the photograph information will be described below in which the magnetic gap section of the magnetic head can adhere fittingly to the magnetic record section of the stripe form of the film and the flatness of the film can be increased.

Figure 10:
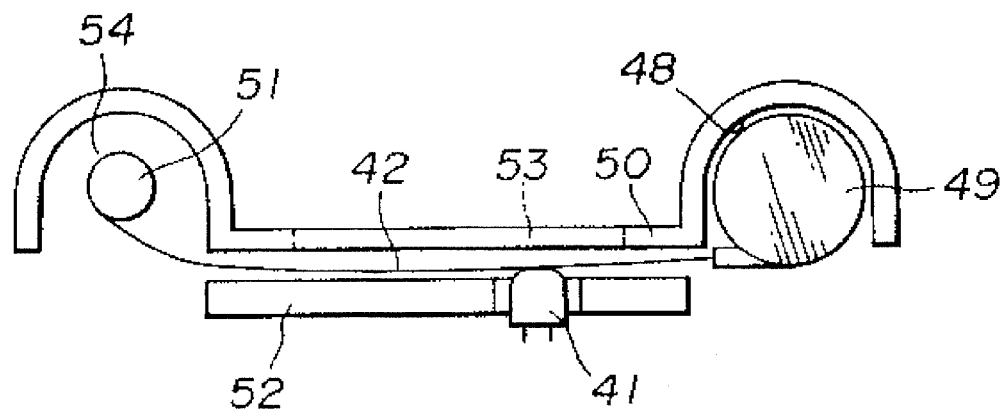
FIG. 10 is a plan view showing an example of arrangement of a magnetic head of the camera capable of magnetically recording the photograph information.

In such a type of film having the stripe-shaped magnetic record section and used for the camera, the stripe-shaped magnetic record section is generally provided by coating or depositing on the side opposite to photosensitive emulsion side. Therefore, as shown in FIG. 10, the magnetic head 41 is disposed on a back cover side of the camera opposing the aperture 53 formed on the camera body 50 with respect to the extended film 42 which is pulled out from the film patrone 49 loaded in the film supply chamber 48 which is formed in the camera body 50 and is wound on the winding spool 51 in the film winding chamber 54, and the magnetic head 41 is also so arranged that the magnetic gap section 41*a* contacts the stripe-shaped magnetic record section 42*a* (see FIG. 11) which is disposed along the lower portion of the film in a longitudinal direction.

Figure 11:
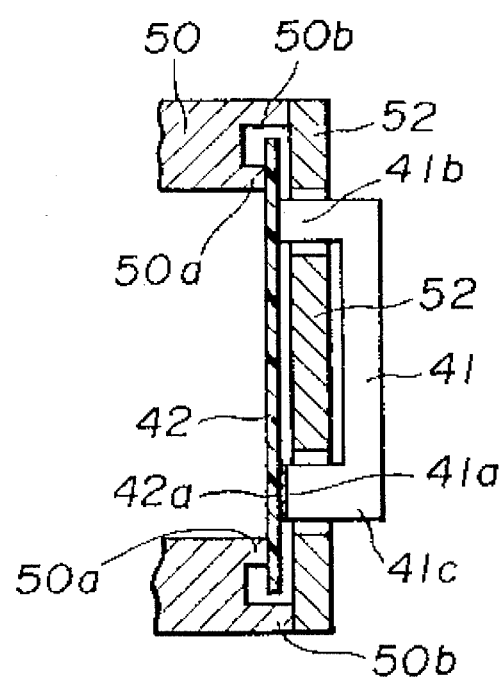
FIG. 11 is an expanded view of a vertical cross section of the magnetic head shown in FIG. 10.

As shown in FIG. 11, this magnetic head 41 has a vertical cross section constructed such that a winding (not shown) is provided on a core of a lateral channel form, and a head distal end portion 41*c* which is bent and extended in an orthogonal direction at the lower portion of the head, and is mounted on a back cover (not shown) together with a film pressing plate 52 such that the magnetic gap section 41*a* formed in the distal end portion 41*c* penetrates a hole disposed on a film pressing plate 52 to contact with the stripe-shaped magnetic record section 42*a* of the film 42.

Further, a head distal end portion 41*b* which is bent and extended forwardly at the upper portion of the magnetic head 41 in an orthogonal direction is a dummy head section and also penetrates a hole disposed on the film pressing plate 52 to contact the upper back surface of the film 42. This is provided to keep the flatness of the film 42 guided by a film rail 50*a* of the camera body 50. Although the magnetic gap section 41*a* contacts the stripe-shaped magnetic record section 42*a* at the lower portion of the film back surface, portion 41*b* presses the upper portion of the film and is symmetric with respect to the lower portion so that the film can be prevented from being inclined to keep the flatness of the film 42. It is noted that a reference numeral 50*b* denotes a pressing plate rail.

Figure 8:
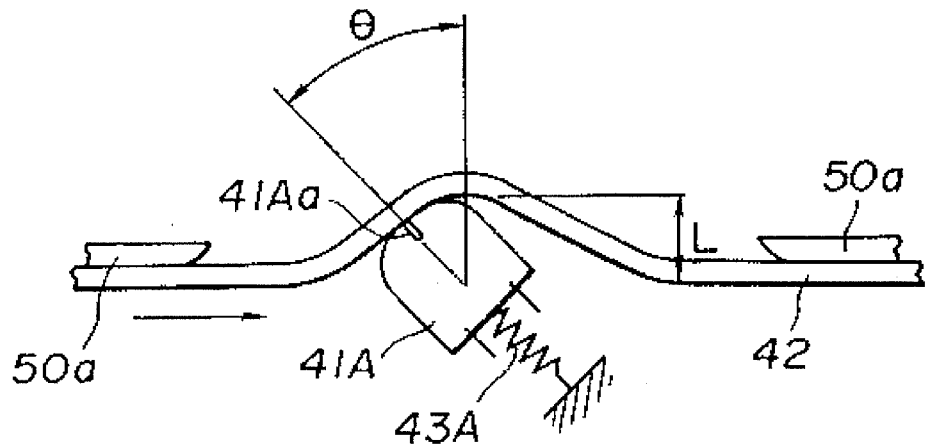
FIG. 8 is an expanded plan view of a magnetic head of a camera capable of magnetically recording photograph information according to a fourth embodiment of the present invention.

FIG. 8 is an expanded plan view of a camera capable of magnetically recording a photograph information on a film according to a fourth embodiment of the present invention. In this embodiment, a magnetic head 41A is pressed against the film by a pressing spring 43A to have an overgoing amount L for the film traveling along the film rail 50*a* and the magnetic gap section 41A*a* is aligned at an inclined angle of θ with respect to the traveling direction of the film 42.

By arranging the magnetic head 41A in this manner, even if the thick film 42 having a great firmness travels in a direction shown by an arrow and contacts with the magnetic head 41A to have a bent portion, the magnetic gap section 41A*a* contacts with the magnetic record section 42*a* (see FIG. 11) at a substantially right angle because the magnetic gap section 41A*a* is inclined in correspondence to the bent portion. Thus, the fit of the magnetic gap section 41A*a* to the magnetic record section 42*a* of the film is improved and the film can be prevented from being damaged because the traveling load of the film 42 is not increased.

Figure 9:
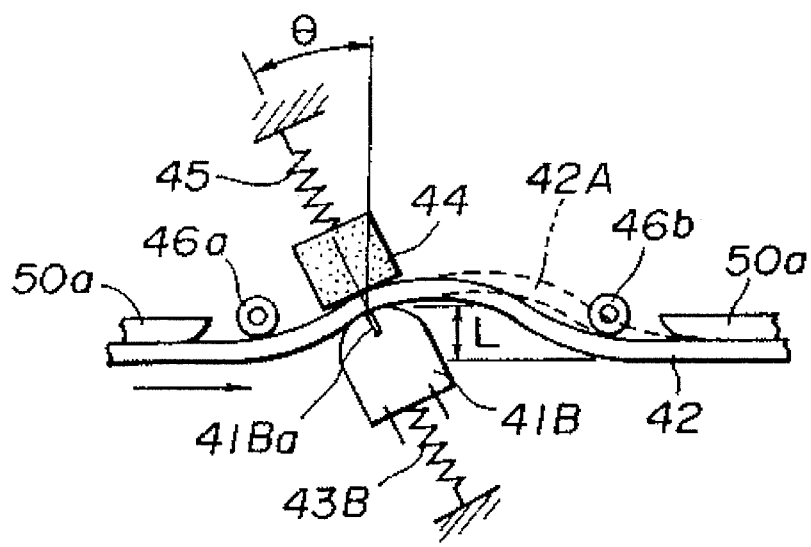
FIG. 9 is an expanded plan view of a magnetic head of a camera capable of magnetically recording photograph information according to a fifth embodiment of the present invention.

FIG. 9 is an expanded plan view of a camera capable of magnetically recording photograph information on a film according to a fifth embodiment of the present invention. In this embodiment, in addition to the arrangement in the fourth embodiment, there is provided a pressing pad 44 and rollers 46a and 46b for restricting the bent portion of the film. That is, the magnetic head 41B is disposed to have an inclined angle of θ with respect to the traveling direction of the film 42 and pressing pad 44 is arranged opposite the magnetic head 41B to sandwich the film 42 and the film 42 is sandwiched by the head driving spring 43B and the pad driving spring 45. In this case, it is not necessary driving springs 43B and 45 have very strong elasticity, as described with reference to FIG. 18.

A pair of rollers 46a and 46b for restricting the bent portion is rotatably arranged at the front and back positions on the side of pressing pad 44 in the traveling direction of the film 42. The rollers 46a and 46b are arranged such that the outer surface is located in the same plane as the rail plane of the film rail 50a.

In the fifth embodiment constructed in this manner, the thick film 42 having the great firmness travels in a direction shown by the arrow and the position where the film 42 contacts magnetic head 41B so that the bent portion appears is restricted by the roller 46a. The film which has passed through the roller 46a starts to bend and after traveling while the film is sandwiched between the magnetic head 41B and the pressing pad 44 the film starts further bending. However, the bending is restricted by the other roller 46b to make the bent portion small. In this manner, the magnetic gap section 41Ba contacts stripe-shaped magnetic record section 42a of the film 42 having the bent portion restricted, at a substantially right angle so that the magnetic recording and reproduction can be reliably achieved.

In this manner, according to the fifth embodiment, by providing the pressing pad and the pair of rollers for restricting the bent portion, the fitness of the magnetic gap section to the stripe-shaped magnetic record section of the film can be further improved.

Figure 12:
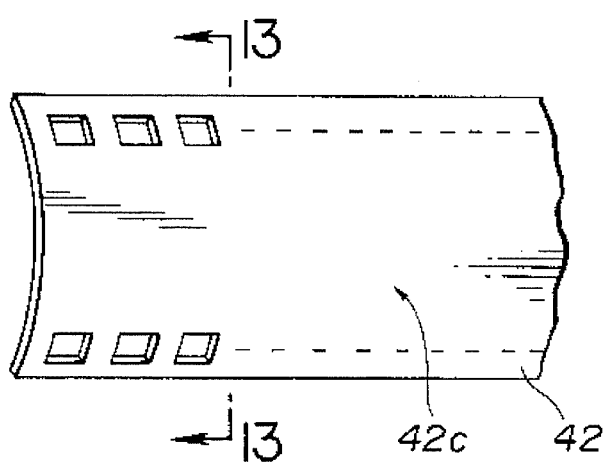
FIG. 12 is a perspective view of a main portion of a film for explaining curling of a roll film.
Figure 13:
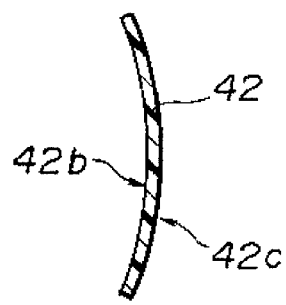
FIG. 13 is a cross sectional view of the film taken along 13—13 line in FIG. 12.

Next, there will be described below the increasing of the flatness of the film by arrangement of the magnetic head as described above, with reference to FIGS. 12 to 16. The film 42 accommodated in the film patrone in a roll fashion is wound on a spool in the patrone such that the emulsion surface 42b is inside. Therefore, as shown in FIGS. 12 and 13, when the film is pulled out from the patrone the film is in a curled state in which the film has a concave surface in view from the emulsion surface such that the film is bent toward a back base surface as a bow, as shown in FIGS. 12 and 13.

Figure 14:
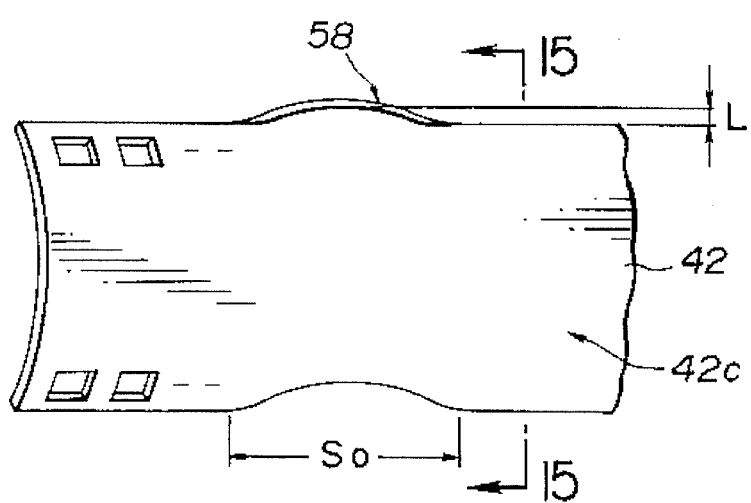
FIG. 14 is a perspective view of a main portion of the film for showing a relation of the curling of the film and a bent portion width.
Figure 15:
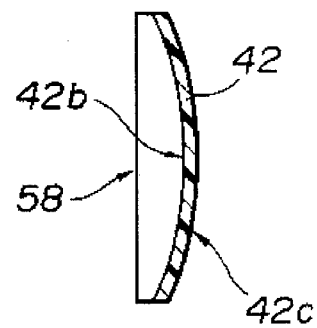
FIG. 15 is a cross sectional view of the film taken along 15—15 line in FIG. 14.

Therefore, if the above overgoing amount L is given to the magnetic head 41 for the film 42, the direction of the bending 58 due to movement over the magnetic head 41 is reverse to the curling direction so that the width is made wide to an amount S0 in the traveling direction, which influences the flatness of the film, as shown in FIGS. 14 and 15.

Figure 16:
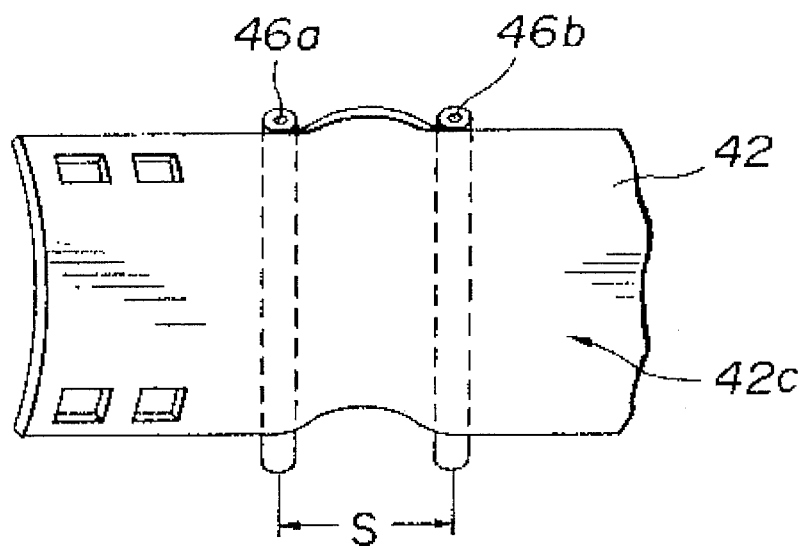
FIG. 16 is a perspective view of a main portion of the film for showing a relation between the curling and the bent portion of the film in the present invention.
Figure 17:
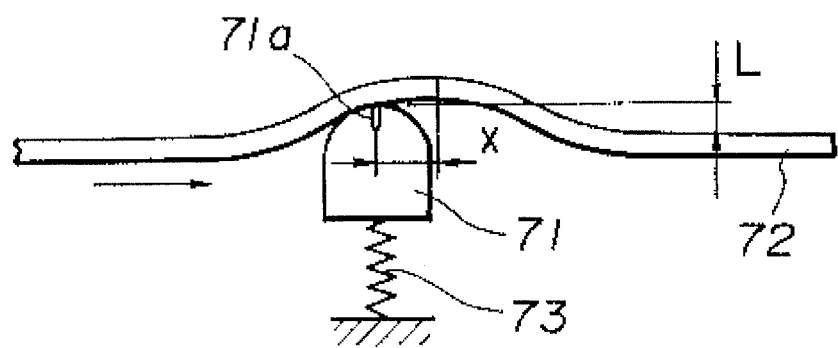
FIG. 17 is an expanded plan view for explaining a relation of the magnetic head to the bent portion width.

However, as shown in the fifth embodiment (see FIG. 9), if the pair of rollers for restricting the bent portion 46a and 46b are arranged with a distance S before and after the magnetic head 41 giving the overgoing amount L as shown in FIG. 16, the region where the flatness of the film is influenced can be made narrower. In addition, because of positioning of the rollers 46a and 46b such that the outer surfaces of the rollers are on the same plane as the film rail plane and a relation of the rollers and a film pressing plate (not shown) in contact with the film base surface 42c to ensure the flatness of the film, the flatness of the film can be obtained well.

It should be noted that although there is described the film in which the magnetic record section is disposed on the back side of the film, i.e., on the surface opposite to the emulsion surface, there may be the film in which the magnetic record section is provided on the emulsion side of the film outside of the photograph screen. In this case it would be needless to say that the magnetic head is disposed opposing to the magnetic record section.

Figure 18:
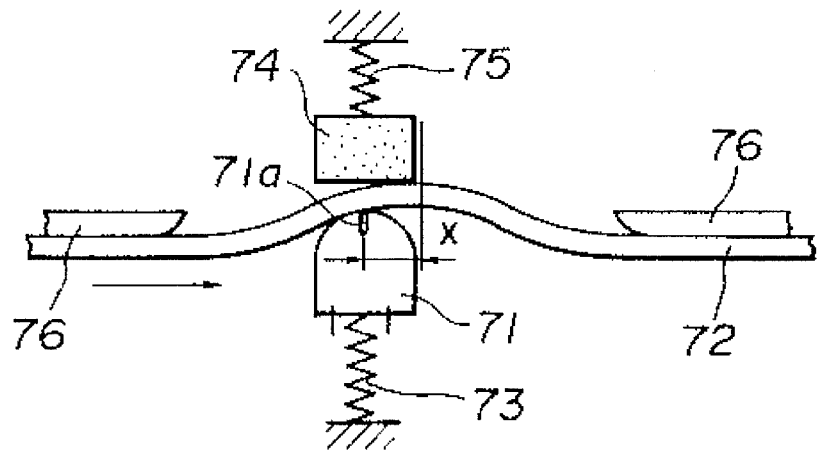
FIG. 18 is an expanded plan view showing an example of conventional film pressing means using a magnetic head and a pressing pad.
Figure 19:
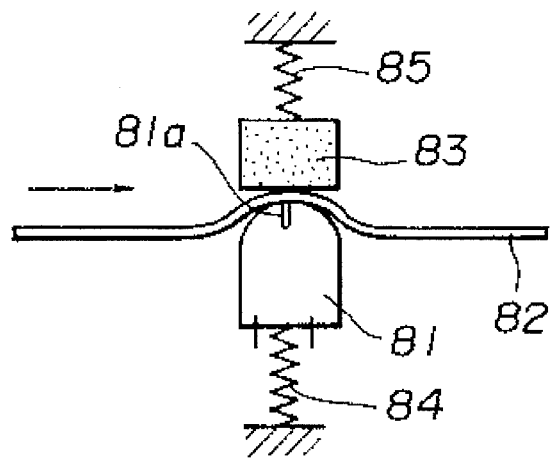
FIG. 19 is an expanded plan view showing an example of conventional magnetic head pressing means against an audio magnetic tape.

Further, the film rails 50a and 76 are illustrated in FIGS. 8, 9 and 18 such that these are separated at the portion about the magnetic head. However, this is because of simplicity of the figures and actually these film rails are continuous. Furthermore, the magnetic head 41 is illustrated to be arranged in opposite to a part of the aperture 53 FIG. 10. However, the magnetic head 41 may be arranged to lie outside of the perimeter of aperture 53.

What is claimed is:

1. A camera using a film having a magnetic section, comprising:

magnetic head means having a magnetic gap for selectively recording and reproducing information on said magnetic section of the film; and guiding means for guiding said film along a substantially linear path as the film is fed in a given direction;

said magnetic head means being inclined at a given angle to a line perpendicular to a film sending direction;

striking means for resiliently urging said magnetic head means to engage a surface of said magnetic record section in a gap region provided in said guide means so that a portion of the film in the gap region is urged away from the linear path and assumes a curved path, said head means engaging a concave surface of said film in said gap region;

said striking means including means for orienting the magnetic head means so that a gap in said magnetic head lies a given distance upstream from an apex of the curved portion of film in said gap region to enhance good surface engagement of said magnetic head means and the concave surface of said film, whereby lines extending through said apex of said curved portion of film and said gap form said given angle.

2. A camera according to claim 1, wherein said striking means comprises an elastic member.

3. A camera using a film having a magnetic section, comprising:

magnetic head means .having a magnetic gap for selectively recording information on and reproducing information recorded on said magnetic section; and striking means for maintaining said magnetic head means inclined at a given angle upstream with respect to a first line perpendicular to a film sending direction, said striking means urging said magnetic head means to strike said magnetic record section, so that a portion of film is urged away from a plane coinciding with said sending direction and is curved to provide a concave surface confronting said magnetic head means, wherein a second line extending through a striking position of said magnetic gap and said film plane and perpendicular to a tangent of said film at said striking position forms a predetermined angle with said first line perpendicular to the film sending direction, said first line extending through an apex of said curved portion of film, said second line being upstream relative to said first line, and further comprising pad means positioned to oppose said magnetic head means across the film, said film being between said magnetic head means and said pad means, said pad means for absorbing a force applied to said film from said striking means in a direction perpendicular to a tangent to said curved film at a point of contact between said film and said magnetic head on said normal line direction.

4. A camera according to claim 3, wherein said pad means comprises a cushioning member engaging said film and a pressing member pressing said cushioning member against said film in a direction along said second line.

* * * * *